United States Patent [19]
Newell

[11] 3,968,952
[45] July 13, 1976

[54] ASSEMBLY FOR PULLING A LINE

[76] Inventor: E. Strohm Newell, 2350 Sixth Ave., San Diego, Calif. 92101

[22] Filed: Aug. 22, 1974

[21] Appl. No.: 499,674

[52] U.S. Cl. .................. 254/134.3 R; 254/139.1
[51] Int. Cl.² .................................. E21C 29/16
[58] Field of Search ............ 254/139.1, 135 R, 139, 254/143, 134.3 R, 134.3 FT; 214/1 H, 1 SW; 212/57, 58 R, 59 R

[56] References Cited
UNITED STATES PATENTS

| 307,986 | 11/1884 | Porritt .............................. 254/139 |
| 2,221,903 | 11/1940 | Abramson et al. ............ 254/134.3 R |
| 2,948,510 | 8/1960 | Kieser .............................. 254/139.1 |
| 2,953,259 | 9/1960 | White .............................. 212/58 R |
| 2,985,430 | 5/1961 | Greenwood ...................... 254/143 |
| 3,072,382 | 1/1963 | Jones ............................. 254/134.3 R |
| 3,072,383 | 1/1963 | Vanderhagen ............... 254/134.3 R |
| 3,226,088 | 12/1965 | Habighorst ................... 254/134.3 R |
| 3,306,468 | 2/1967 | Pollack ............................. 212/59 R |

Primary Examiner—Frank E. Werner
Attorney, Agent, or Firm—Neil F. Markva

[57] ABSTRACT

The assembly for pulling a line comprises a frame, a power unit mounted on the frame and means for guiding a line from the power unit along the frame structure. The frame has a structural configuration that is adjustable to a plurality of working positions. The frame includes a base frame section, a boom frame section, a conduit adaptor frame section and means to hold the frame sections in a desired position with respect to each other.

13 Claims, 11 Drawing Figures

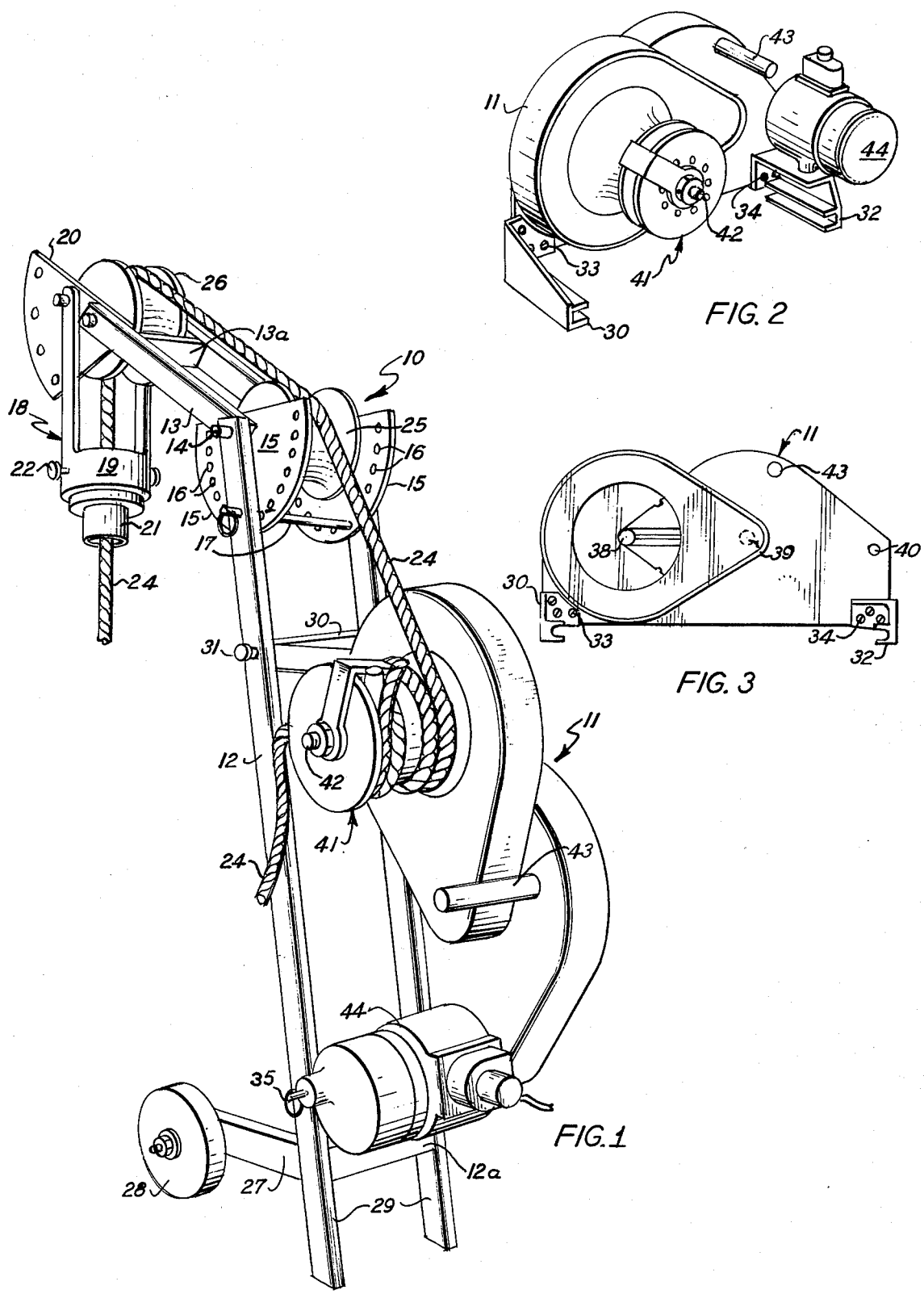

ASSEMBLY FOR PULLING A LINE

BACKGROUND OF THE INVENTION

This invention relates to a mechanism used for pulling a line. More particularly, the assembly is used for providing a cable and wire pulling system.

Line pulling systems are well known in the prior art. Such prior art systems include the use of a power unit that is mounted in various ways to effectuate the pulling of a line through a conduit or along a series of poles such as telephone wire.

The known line pulling system is composed of several different working parts which require the help of at least two men to install at the working site. That is, as one man holds up a frame structure, a second man must chain the power unit onto the frame of the conduit before the system becomes operable at the working site. The separate frame members must be chained together and then the power unit must be chained onto one of the frame members.

The prior art line pulling system therefore has several disadvantages. There are a plurality of parts which are cumbersome to handle. It requires at least two men to set the prior art system up thereby increasing labor costs associated therewith.

PURPOSE OF THE INVENTION

The primary object of this invention is to provide an assembly for pulling a line which requires only one man to set it up and operate it.

Another object of this invention is to provide a line pulling system wherein tough pulling jobs are eliminated with no line override or dangerous line slippage occurring during operation thereof.

Another object of this invention is to provide a system which exerts a constant pulling tension on the line once it starts up thereby reducing friction on the capstan and extending the life of the lines being used.

A still further object of this invention is to provide an assembly for pulling a line including a frame having a structural configuration that is adjustable to a plurality of working positions and is thereby adaptable to numerous types of line pulling positions so that it is capable of pulling from virtually any horizontal or vertical position without the requirement of additional attachment to make basic pulls.

A further object of the invention is to overcome the disadvantages associated with prior art pulling systems.

SUMMARY OF THE INVENTION

These objects and other advantages are accomplished through the use of an assembly comprising a frame, a power unit mounted on the frame structure and means for guiding a line from the power unit along the frame structure. The frame has a structural configuration that is adjustable to a plurality of working positions. A boom frame section is pivotally disposed with respect to a base frame section. A holding means is included in the frame to fix the working position of the boom frame section with respect to the base frame section during the pulling operation.

Another feature of the invention is directed to the holding means which includes a positioning means connected to one of the frame sections and a means to lock the positioning means at a desired location so that the boom frame section is fixed with respect to the base frame section. In a specific embodiment, the holding means includes an adjusting plate attached to one of the frame sections and means to lock the adjusting plate in position thereby maintaining the working position as stated.

Another feature of the invention is directed to the use of an adaptor frame section that is pivotally disposed at the outer end of the boom frame section. The adaptor frame section is used to connect the assembly to the conduit through which a line is being pulled.

A further feature of the invention is directed to the manner in which the power unit is attached to the base frame section. The base frame section includes a horizontally disposed support member and the power unit includes a bracket member located on the line pulling end of the power unit. The bracket member is adapted to fit over the horizontal support member of the frame section. A support frame section located at the bottom end of the base frame section maintains the base frame section in an upright position so that the power unit may easily be placed in working position by one man onto the base frame section.

BRIEF DESCRIPTION OF DRAWINGS

Other objects and features of this invention will appear in the following description and appended claims, reference being made to the accompanying drawings forming a part of the specification wherein like reference characters designate corresponding parts in the several views.

FIG. 1 is a perspective view of an assembly made in accordance with this invention.

FIG. 2 is a perspective view of the power unit made in accordance with this invention.

FIG. 3 is a diagrammatic elevational view of the power unit of FIG. 2, and

DESCRIPTION OF SPECIFIC EMBODIMENTS

Figure 4:
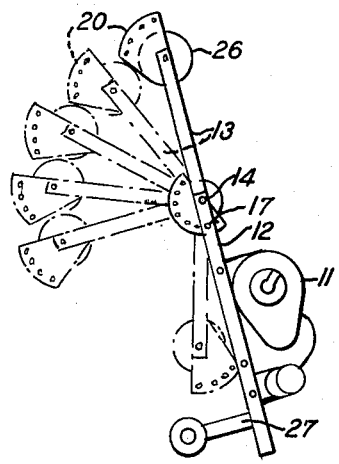
FIGS. 4 through 11 show the assembly made in accordance with this invention in various working positions.

More specifically, referring to FIG. 1, an assembly, generally designated 10, includes a power unit 11 mounted on a base frame section 12. A boom frame section 13 is pivotally disposed about the shaft 14 so that the frame has a structural configuration that is adjustable to a plurality of working positions. The base frame section 12 and boom frame section 13 include horizontal support elements 12a and 13a, respectively.

In this embodiment, an adjusting plate 15 is connected to the boom frame section 13. The adjusting plate 15 includes a plurality of openings 16. When the boom frame section 13 is disposed in the desired location, a pin 17 extends through the parallel frame members of the base frame section 12 and the openings 16 thereby maintaining the working position of the boom frame section 13 with respect to the base frame section 12. It is possible that the location of the pin and the pin 17 and adjusting plate 15 might be reversed with respect to the frame sections 12 and 13. Other equivalent holding means are contemplated to achieve the desired result set forth herein.

A conduit adaptor frame section 18 has a fork configuration which is pivotally connected at one end to an adjusting plate 20. The adjusting plate 20 has a plurality of openings and is fixedly attached to the outer end of the boom frame section 13. The adaptor frame section 18 includes a collar 19 into which is placed a hub element 21 fixed in place by thumb screw 22. The hub element 21 is designed to fit the opening of the conduit 23 through which a line 24 is being pulled. See particularly the FIGS. 5 through 11 showing such a relationship. Hub element 21 may be interchangeable to adapt to various sized conduits.

The center sheave member 25 is rotatably mounted in a known manner on the shaft 14 located at the inner end of the boom frame section. A second sheave member 26 is disposed in a known manner at the outer end of the boom frame section 13. The sheave members 25 and 26 constitute means for guiding line 24 from the power unit 11 along the frame structure.

A support frame section 27 is located at the bottom of the base frame section 12 and includes a pair of wheels 28 located at the end of the parallel elements extending outwardly from the base frame section 12. Legs 29 extend from the base frame section 12 and thereby provide the assembly with a four point contact when the wheels 28 are also touching a horizontal surface.

The power unit 11, as stated hereinabove, is mounted on the base frame section 12. In this specific embodiment, the power unit 11 includes a bracket member 30 having an open channel shape attached at the line pulling end of the power unit 11. The base frame section 12 includes a horizontal support member 31. The open channel shape of the bracket 30 is effective to hang over horizontal bracket 31.

A second bracket member 32 is attached to the other end of the power unit 11 and also has an open channel configuration. The bracket members 30 and 32 are fastened to the housing of the power unit 11 by bolts 33 and 34, respectively. Thus, the power unit 11 can be removed or placed onto the base frame member very easily. The top pin or support member 31 is fixed in place. The power 11 is hung onto the pin 31 and then a second pin 35 is inserted through the parallel members of the base frame section 12 and the opening of the bracket member 32.

The power unit 11 includes a capstan puller device 41 which is mounted on the shaft 42 within the bushing 38. The capstan puller 41 is made in accordance with the assembly disclosed in my U.S. Pat. No. 3,730,483 issued May 1, 1973, the disclosure of which is incorporated herewith. A drive motor 44 is mounted on the top of the bracket 32 and its driven shaft extends into the bushing 40. The drive mechanism within the housing of the power unit 11 may be made in accordance with prior art systems. That is, a large driven pulley is mounted on the shaft within the bushing 39 and driven by the motor shaft extending through bushing 40. A second drive pulley mounted on the shaft 39 drives the capstan 41 via a chain mechanism. As stated, the drive mechanism for the power unit 11 may be made in accordance with well known prior art techniques.

The drive motor 44 is a ¾ horse power motor. It is possible, where a two speed operation is desired, that the motor may operate at 15 feet per minute for heavy pulls and 30 feet per minute for lighter pulls.

Figure 5:
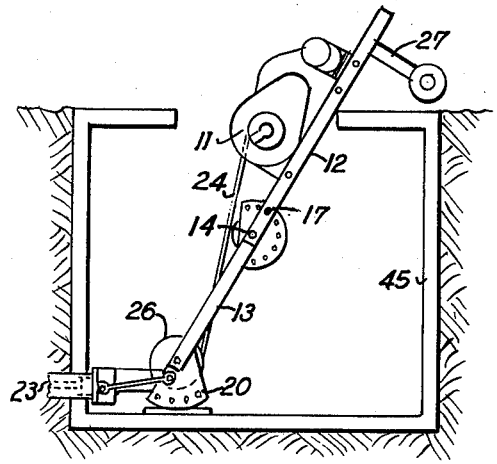
Figure 6:
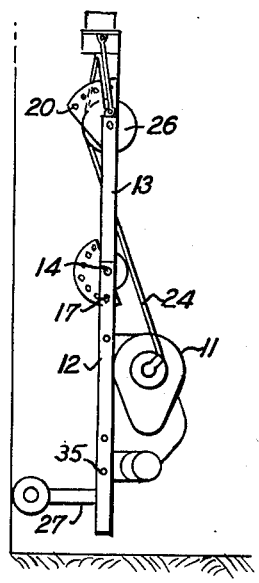
Figure 7:
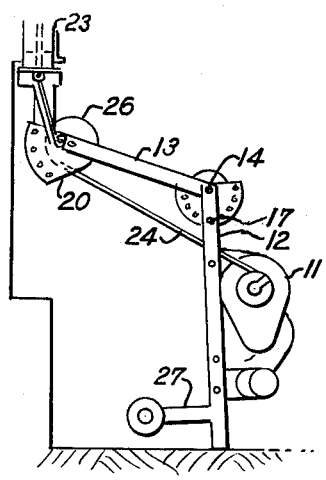
Figure 8:
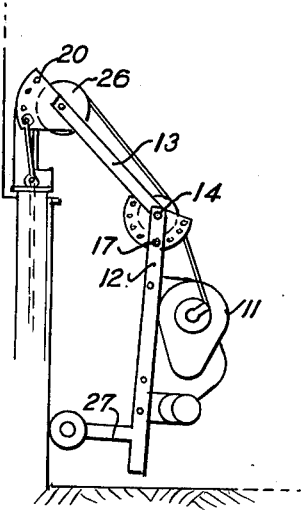
Figure 9:
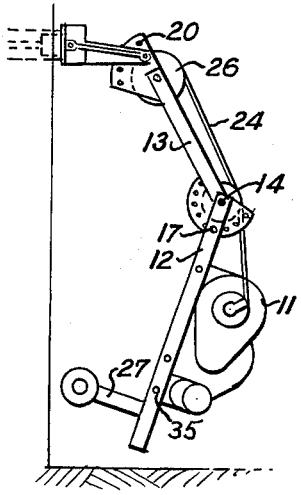
Figure 10:
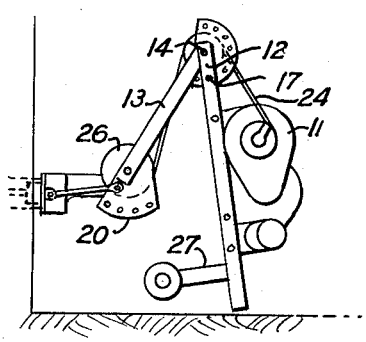
Figure 11:
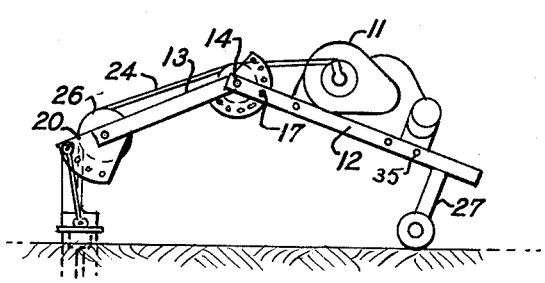

The boom frame section 13 may be disposed in various working positions as shown in FIG. 4. Here the base frame section 13 is in an upright position with the wheels 28 and the legs 29 in contact with the horizontal flat surface. The set-up in FIG. 5 shows a vault pull such as required in pulling from a manhole 45. The set-up of FIG. 6 is a suspended downward pull and the set-up of FIG. 7 is a downward pull with the base frame section 12 resting on the horizontal ground. FIGS. 8 and 9 show suspended vertical and horizontal pulls, respectively. The set-ups in FIGS. 10 and 11 are illustrative of a horizontal and vertical pull, respectively, where the base frame section 12 is supported on the horizontal ground surface.

ADVANTAGES OF THE INVENTION

The assembly made in accordance with this invention is a completely self-contained apparatus. It can be folded up and rolled along from one location to another without lifting and carrying extra parts. The puller can be set up and locked into place ready to use with very little effort and time. All of the disadvantages associated with the known prior are pulling system are overcome through the use of the assembly as disclosed herein.

While the assembly for pulling a line has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, What is claimed is:

1. An assembly for pulling a line comprising:
   a. a frame structure having a base frame section and a structural configuration that is adjustable to a plurality of working positions,
   b. a power unit mounted on the frame structure, and
   c. means for guiding a line from the power unit along the frame structure,
   d. a power unit including means for hanging the unit onto the base frame section,
   e. said base frame section including a horizontal support member,
   f. said power unit hanging means including a bracket member having an open channel shape attached at the line pulling end of the power unit,
   g. said open channel shape of the bracket being effective to hang over the horizontal support member.

2. An assembly for pulling a line comprising:
   a. a frame structure having a structural configuration that is adjustable to a plurality of working positions,
   b. said frame structure including a base frame section, a boom frame section, a conduit adaptor frame section, a support frame section and means to fixedly hold the frame sections in a desired position with respect to each other,
   c. said support frame section being fixedly disposed at one end of the base frame section, said boom frame section being pivotally disposed with respect to the other end of the base frame section, and the conduit adaptor frame section being pivotally disposed with respect to the boom frame section, said conduit adaptor frame section including means being received within a conduit through which a line is being pulled,
   d. a power unit mounted on the frame structure, and
   e. means for guiding a line from the power unit along the frame structure.

3. An assembly as defined in claim 2 wherein
   said power unit having a hanging means including a first bracket member attached to one end of the power unit and a second bracket member attached to the other end of the power unit,
   said bracket members being adapted to receive pin members connected to the base frame section.

4. An assembly as defined in claim 2 wherein
the holding means includes a first positioning means for maintaining the boom frame section in a working position with respect to the base frame section and second positioning means for maintaining the adaptor frame section with respect to the boom frame section.

5. An assembly as defined in claim 4 wherein
said second positioning means includes an adjusting means located at the outer end of the boom frame section and defines a series of positions to which the conduit adaptor frame section is pivotally disposed.

6. An assembly as defined in claim 2 wherein
said conduit adaptor means includes a hub portion for connecting the assembly to a conduit through which a line is being pulled.

7. An assembly as defined in claim 2 wherein
said guiding means includes a sheave member located at the inner end of the boom frame section on the pivotal axis between the boom frame section and the base frame section and a second sheave member disposed at the outer end of the boom frame section.

8. An assembly for pulling a line comprising:
a. a frame structure having a structural configuration that is adjustable to a plurality of working positions,
b. said frame structure including a base frame section, a boom frame section, a conduit adaptor frame section and means to hold the frame sections in a desired position with respect to each other,
c. said boom frame section being pivotally disposed with respect to the base frame section and said adaptor frame section being pivotally disposed with respect to the boom frame section, said conduit adaptor frame section including means operatively associated with a conduit through which a line is being pulled,
d. a power unit mounted on the frame structure, and
e. means for guiding a line from the power unit along the frame structure.

9. An assembly as defined in claim 8 wherein
the power unit includes means for hanging the unit onto the base frame section.

10. An assembly as defined in claim 8 wherein
the holding means includes a first positioning means for maintaining the boom frame section in a working position with respect to the base frame section and second positioning means for maintaining the adaptor frame section with respect to the boom frame section.

11. An assembly as defined in claim 8 wherein
said conduit adaptor means includes a hub portion for connecting the assembly to a conduit through which a line is being pulled.

12. An assembly as defined in claim 8 wherein
said guiding means includes a sheave member located at the inner end of the boom frame section on the pivotal axis between the boom frame section and the base frame section and a second sheave member disposed at the outer end of the boom frame section.

13. An assembly as defined in claim 8 wherein
said holding means includes an adjusting means located at the outer end of the boom frame section and defines a series of positions to which the conduit adaptor frame section is pivotally disposed.

* * * * *